United States Patent
Dieberger

(10) Patent No.: US 6,834,373 B2
(45) Date of Patent: Dec. 21, 2004

(54) SYSTEM AND METHOD FOR NON-VISUALLY PRESENTING MULTI-PART INFORMATION PAGES USING A COMBINATION OF SONIFICATIONS AND TACTILE FEEDBACK

(75) Inventor: Andreas Dieberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 09/840,227

(22) Filed: Apr. 24, 2001

(65) Prior Publication Data

US 2002/0156807 A1 Oct. 24, 2002

(51) Int. Cl.[7] .............................................. G06F 17/00
(52) U.S. Cl. ..................... 715/501.1; 345/163; 345/173
(58) Field of Search ..................... 715/501.1; 345/163, 345/156, 157, 173; 382/114; 434/114

(56) References Cited

U.S. PATENT DOCUMENTS

| | | | | |
|---|---|---|---|---|
| 5,186,629 A | * | 2/1993 | Rohen ........................... 434/114 |
| 5,736,978 A | * | 4/1998 | Hasser et al. .................. 345/173 |
| 5,825,308 A | | 10/1998 | Rosenberg ...................... 341/20 |
| 5,844,392 A | | 12/1998 | Peurach et al. ............... 318/568.17 |
| 5,899,975 A | | 5/1999 | Nielsen ........................ 704/260 |
| 5,956,484 A | | 9/1999 | Rosenberg et al. ......... 395/200.33 |
| 5,977,867 A | | 11/1999 | Blouin ......................... 340/407.2 |
| 6,078,308 A | | 6/2000 | Rosenberg et al. ............ 345/145 |
| 6,085,161 A | | 7/2000 | MacKenty et al. ............. 704/270 |
| 6,088,675 A | | 7/2000 | MacKenty et al. ............. 704/270 |
| 6,101,530 A | | 8/2000 | Rosenberg et al. ............ 709/203 |
| 6,115,482 A | * | 9/2000 | Sears et al. .................. 382/114 |
| 6,125,385 A | | 9/2000 | Wies et al. ................... 709/203 |
| 6,131,097 A | | 10/2000 | Peurach et al. ............... 707/102 |
| 6,278,441 B1 | * | 8/2001 | Gouzman et al. ............. 345/163 |
| 6,502,032 B1 | * | 12/2002 | Newman ....................... 701/213 |
| 6,636,202 B2 | * | 10/2003 | Ishmael, Jr. et al. ......... 345/173 |

OTHER PUBLICATIONS

IBM Technical Disclosure Bulletin, "Cooperative Web Navigation System for Blind and Sighted People," vol. 4, No. 11, Nov. 1997, pp. 35–36.

Research Disclosure, "Method for Providing Relative Audio Feedback in a scrollable Content Area," Feb. 1999, p. 252.

* cited by examiner

*Primary Examiner*—Sanjiv Shah
(74) *Attorney, Agent, or Firm*—Lacasse & Associates, LLC; Randy W. Lacasse

(57) ABSTRACT

A visually impaired user is provided a non-visual, abstract representation of a multi-part information page. The non-visual, abstract representation is provided by auditory and tactile feedback. A touch pad provides tactile feedback for the boundaries between content areas of the page when the user's finger is located at coordinates on the touch pad which map to the boundaries between the content areas of the page. Auditory feedback provides meta-information on the content within a content area when the user's finger is located at coordinates on the touch pad which map to the content area.

26 Claims, 9 Drawing Sheets

1: Web server sends response to a request
2: Intermediary processes page and sends data to browser and interface component
3: User interacts with either browser or interface component which might trigger a new request
4: Intermediary passes request on to Web where a server responds

SYSTEM AND METHOD FOR NON-VISUALLY PRESENTING MULTI-PART INFORMATION PAGES USING A COMBINATION OF SONIFICATIONS AND TACTILE FEEDBACK

BACKGROUND OF THE INVENTION

1. Field of Invention

The present invention relates generally to the field of non-visual displays. More specifically, the present invention is related to the non-visual display of multi-part information pages.

2. Discussion of Prior Art

Visually impaired users of computers implementing graphical user interface (GULI) environments face a number of issues. These issues arise because separate content is often displayed simultaneously in different spatially located areas of the screen in these environments, while the interfaces for visually impaired users represent this content in a linearized fashion. The problems arising from displaying content in a spatially distributed manner are particularly troublesome for visually impaired users who attempt to interface with the World Wide Web.

Many pages on the World Wide Web utilize "frames," which partition the information displayed into a number of discrete segments in the user's browser in order to create complex navigation tools for the site. When the user follows a link in one of the frames, the corresponding new content typically appears in either the frame that contained the originating link or in a single different frame, but the other frames in the display usually remain unchanged. Frames pose a major difficulty to visually impaired users because, after clicking a link, it is not immediately obvious to them that only one of several frames was updated.

This change is not immediately obvious to visually impaired users because visually impaired users typically use screen readers to access the content of Web pages. These screen readers linearize the sequence of items in a layout based on the hierarchical structure of the page. As a consequence, even though only one frame has been updated, it is necessary to scan through the entire page layout and re-discover the page as a whole to determine where changes occurred.

In addition, as these methods to render the output to a visually impaired user do not provide an overall layout of the areas in which content is displayed, there is not a common frame of reference for collaboration between a sighted user and visually impaired user. The visually impaired user receives a linearized version of a page, while sighted users can perceive the layout of a page more or less as a whole. When a sighted and a visually impaired user work together on a Web page, this difference in how to perceive the layout of the page can make it quite difficult to refer to items on the screen. The concept of "in the top right corner of the screen" is not directly usable for the visually impaired user. This impairs any collaboration effort between these two types of users.

The following references are examples of the recent efforts to provide better interfaces for visually impaired users to access information, or to provide non-visual feedback to a user generally. However, whatever the precise merits, features and advantages of the references below, none of them achieve or fulfills the purposes of the present invention.

U.S. Pat. Nos. 6,088,675 and 6,085,161 describe a system and method for auditorially representing pages encoded in a mark-up language. These references teach the presentation of the content of a Web page as a linear stream of audio information, while avoiding the visual metaphor of a screen. By avoiding the visual metaphor of a screen, a common frame of reference between sighted and visually impaired users cannot be provided.

U.S. Pat. No. 6,078,308 describes the use of force feedback in a graphical user interface environment to provide force feedback click surfaces. These feedback click surfaces are buttons, icons and other specific graphical objects. When a cursor controlled by the user moves over the surface of these specific objects, force feedback slows the movement of the input device the user is utilizing to control the cursor. By continuing to move the cursor past the feedback click surface, the object is selected, as if the user had "clicked" on it with a traditional mouse type input device. This non-visual force feedback, however, is not utilized to represent a higher-level abstract of the information displayed to allow a visually impaired user to understand and follow the overall layout of the visual representation of the information.

U.S. Pat. No. 6,125,385 describes the use of force feedback to provide effects to objects in a Web page. One such effect described is an "enclosure" effect, where a force is placed upon the input device to force the cursor into a geometrically bound area on the screen, or prevent the cursor from entering a geometrically bound area on the screen. Disclosed is the association of enclosure effects with frames of a Web page having particular objects of interest. Further disclosed is the use of a proxy server to pre-process a Web page to add force feedback effects to the Web page, prior to the page being received at the client. A specific teaching, however, of this force feedback to provide a non-visual representation of the overall layout of the visual Web page for a visually impaired user is not provided. In addition, providing information concerning the content of a frame using different non-visual feedback is not disclosed.

U.S. Pat. Nos. 5,825,308; 5,956,484; and 6,101,530 also describe the association of force feedback with graphical objects of a graphical user interface or Web page, such as an enclosure effect to attract the cursor to an object by controlling an input device. U.S. Pat. No. 5,825,308 additionally discloses the use of physical forces on the input device to increase a user's perceptual understanding of the GUI spatial landscape portrayed on a display screen. None of these references, however, describe the use of different, non-visual feedback to provide further information about the object, or about any content displayed within the object. In addition, they do not specifically teach the use of force feedback to provide a common frame of reference for sighted and visually impaired users examining visually displayed data.

U.S. Pat. No. 5,736,978 describes the use of a tactile stimulator array to provide feedback to a non-sighted user to represent a visually displayed graph. As the stimulator array is moved across a digitizer pad, pins in the tactile array are raised to stimulate the user's finger in areas corresponding to the lines of the visually displayed graph. In this manner, the displayed content itself is represented, i.e. the lines of the graphical information, as an illusion of raised features appearing underneath a user's fingers. Audio feedback is utilized to provide additional information about this graphical data, such as axis labels, graph names, titles. While this reference describes the use of two types of non-visual feedback, it teaches the use of these two types to represent various aspects of the non-partitioned content itself. This contrasts with the present invention, which provides one type of non-visual feedback to indicate spatial relationships between different displayed areas of separate content, while a second type of non-visual feedback indicates meta-information about the content in an area.

U.S. Pat. No. 5,977,867 is of general background interest in the sense that it describes an input device of a type that is similar to that preferably utilized in conjunction with the present invention.

The literature "Method for Providing Position Relative Audio Feedback in a Scrollable Content Area," IBM Research Disclosure, v42 n418 p 225, February 1999, describes the use of audio feedback based upon the current size and position of scrollable content within a window being displayed. Disclosed is the use of different sounds to indicate different frames, where the sounds indicate the size of the content within a given frame and the user's relative position within the content. The use of non-visual feedback to represent the page in a higher-level abstract representation, showing major sections in their approximate spatial relationships (e.g., top left, bottom center), however, is not described.

The literature, "Cooperative Web Navigation System for Blind and Sighted People," IBM TDB vol. 4 No. 11 p. 35, November 1997, describes a method to allow a sighted person and a blind person to share the same computer, either to do entirely separate work or cooperatively navigate the Web. Disclosed is the use of different input and output devices for a sighted user and blind user. A mouse and display is used for a sighted user, while a speaker and numeric pad are used for a blind person. However, no mechanism is described to allow a visually impaired user to understand and follow the overall layout of the visual representation of an information page.

SUMMARY OF THE INVENTION

A system and method is provided for non-visually displaying a multi-part information page containing different spatially located areas of separate content. To display the multi-part information page, a non-visual, abstract representation of the multi-part information page is maintained. This non-visual, abstract representation has non-visual display coordinates, which include boundary coordinates and content coordinates. The boundary coordinates define boundaries between the different spatially located areas and are associated with tactile feedback. The content coordinates define the different spatially located areas. Each of the content coordinates is associated with auditory feedback representative of content meta-information for the content of that area. Input position coordinates received from an input device are mapped to the non-visual display coordinates. When position input coordinates map to the boundary coordinates, a tactile output is generated to cause a tactile output device to generate the associated tactile feedback. When position input coordinates map to the content coordinates an auditory output is generated. The auditory output causes an auditory output device to generate the auditory feedback associated with the content coordinates.

DESCRIPTION OF THE PREFERRED EMBODIMENTS

Figure 1A:
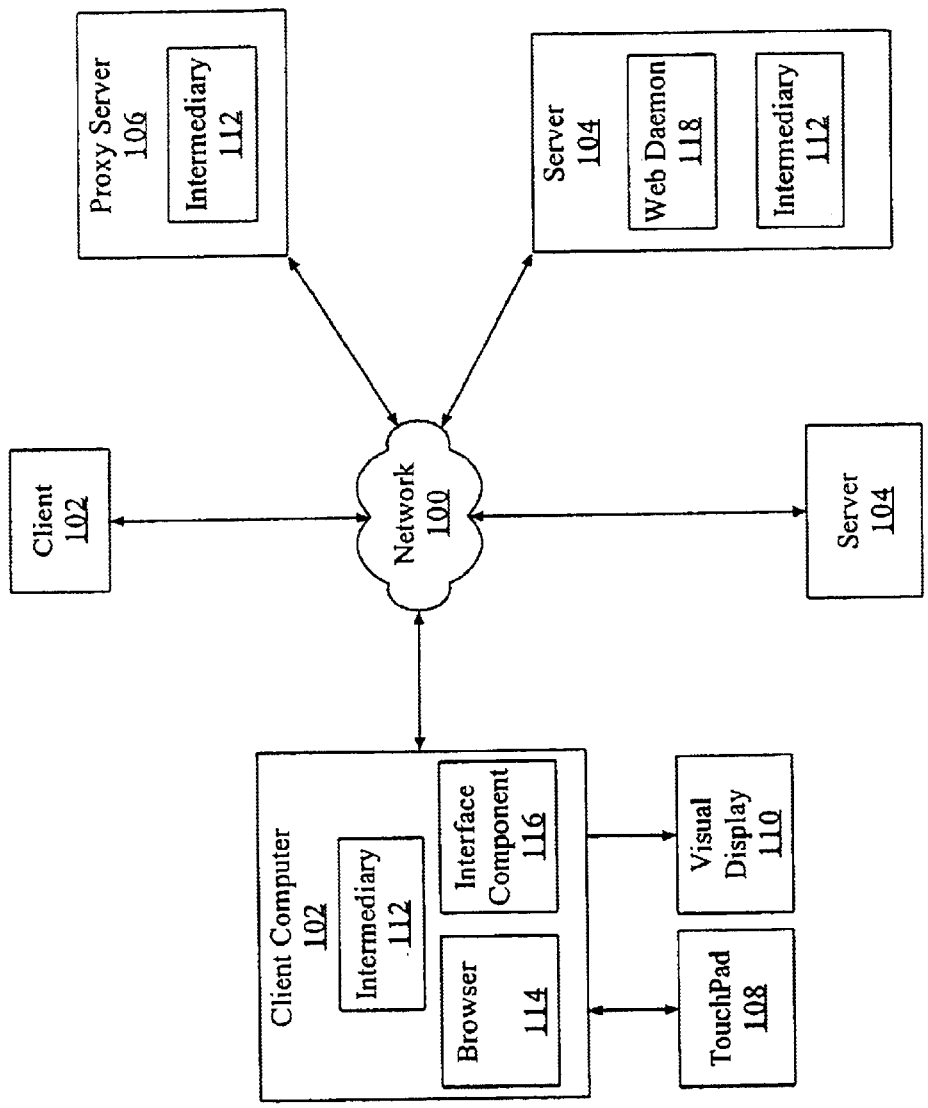
FIG. 1a illustrates a typical distributed computing architecture.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Exemplary Hardware Environment and Overview of the Preferred Embodiment

FIG. 1a schematically illustrates an exemplary computer hardware environment for use with the present invention. More particularly, FIG. 1 illustrates a typical distributed computing architecture using a network 100, which may include LANs, WANs, SNA networks, wireless networks, as well as the Internet. Network 100 connects client computers 102, servers 104 and proxy servers 106, as well as possibly connecting other resources. Servers 104 typically are personal computers, workstations, minicomputers, or mainframes, while client computers 102 are typically personal computers, or workstations.

To exchange data with servers 104, client computers 102 have hardware and execute client software to create connections to servers 104 utilizing communications protocols, such as TCP/IP and HTTP. Servers 104 additionally have hardware for such connections and execute server software such as Web daemons 118. When servers 104 execute Web Daemons 118, such servers 104 are known as Web servers. Client computers 102 connected to Web servers 104 normally retrieve human readable data as web pages written in a mark-up language such as HTML.

At times, rather than connecting directly to servers 104 and retrieving the data, client computers 102 connect first to a so-called proxy server 106. In this case, client computer 102 indicates to proxy server 106 the data to be retrieved from server 104. Proxy server 106 then retrieves this data from server 104 on behalf of client computer 102 and forwards the retrieved data to client computer 102.

In addition to hardware and software for connections to servers 104, client computers 102 have hardware in the form of input/output peripheral devices for interfacing with human users. For use in conjunction with the present invention, client computers 102 preferably have one type of user interface device known as a touch pad 108. Examples of touch pads are the "Glidepoint" touch pads available from Cirque Corp., 2463 South 3850 West Suite A, Salt Lake City, Utah 84120 USA. Touch pad 108 utilizes resistive, capacitive or electromagnetic inductive effects to determine the input position coordinates of a user's finger on a touch surface of touch pad 108 and the type of actions a user's finger performs on the touch surface, such as tapping or sliding, in order to provide user input to client computer 102. The input position coordinates are mapped to the display coordinates for interacting with displayed data.

When utilized with the present invention, touch pad 108 also provides tactile output. Preferably, the tactile output is in the form of vibrations. This may be accomplished by attaching a vibrator to touch pad 108 in a manner similar to that described in U.S. Pat. No. 5,977,867; by mounting touch pad 108 on a voice coil motor or loudspeaker; or by any other equivalent method of producing vibratory feedback.

Client computer 102 also includes an auditory output device (not shown), such as a speaker, for providing auditory output. In the case that touch pad 108 is mounted upon a loudspeaker, the loudspeaker can be utilized to provide the auditory output. Additionally, when the present invention is utilized in its preferred environment, client computer 102 also includes a traditional visual display screen for providing visual output to facilitate collaboration between a sighted and visually impaired user.

Figure 1B:
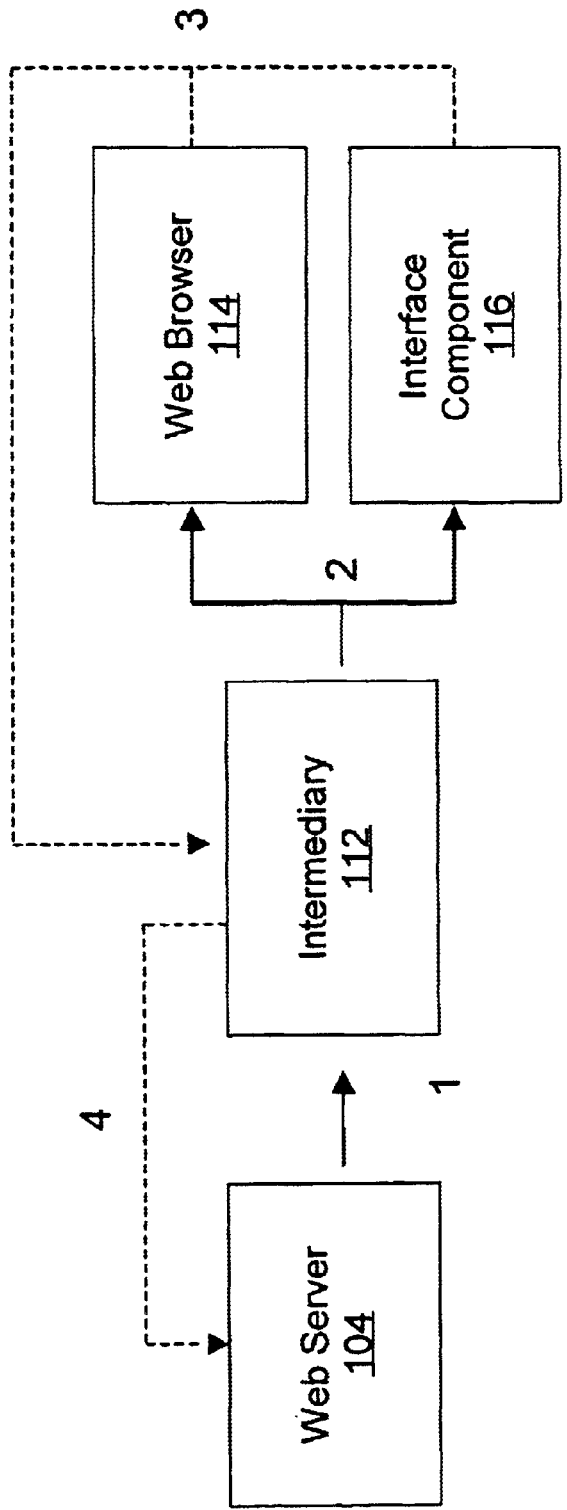
FIG. 1b illustrates the general flow control in the preferred embodiment of the present invention.

Referring to FIGS. 1a and 1b, the preferred embodiment of the present invention comprises an intermediary 112 and an interface component 116. When the present invention is used with web pages, intermediary 112 receives a requested web page from Web server 104, analyzes the page and generates an abstract representation of the page layout. This abstract representation describes the locations of boundaries between areas of content in the layout and includes meta-information on the content in the areas of the layout. This abstract representation of the layout is sent to and maintained by interface component 116. Preferably, a browser 114 is included at client computer 102 to facilitate collaboration between a sighted and visually impaired user; and intermediary 112 passes the received web page to browser 114 for interaction with and display to a sighted user. Via touch pad 108, a user interacts with interface component 116, which processes inputs and provides vibratory and auditory feedback to the user by generating output commands. These output commands cause touch pad 108 and auditory output device to create the respective feedback. The vibratory feedback is provided for the boundaries in order to supply a non-visual representation of the spatial layout of areas of the page, while the auditory feedback supplies the meta-information of the content of the areas. Therefore, a physical, tactile display of the overall layout of the web page is created via touch pad 108, while additionally providing an auditory, abstracted view of content in an area, all of which provides for an easily scanned non-visual display of the web page. When interaction with interface component 116 or browser 114 results in a request for a new page, this request is passed to intermediary 112, which communicates with the appropriate Web server to receive the requested page.

In general, interface component 116 comprises computer readable data and instructions which, when read, interpreted, and executed by client computer 110, causes client computer 102 to perform the steps of the present invention. Likewise, intermediary 112 comprises computer readable data and instructions which, when read, interpreted, and executed by client computer 102, Web server 104, proxy server 106 or any other appropriate processor capable of communication with interface component 116 and Web server 104, causes the executing processor to perform the steps of a further aspect of the present invention. Generally, the data and instructions of interface component 116 and intermediary 112 are embodied in and readable from computer usable storage media, such as magnetic tape, optical disc, compact disc, hard disk, floppy disk, ferroelectric memory, EEPROM, flash memory, EPROM, ROM, DRAM, SRAM, SDRAM, ferromagnetic memory, optical storage, charge coupled devices, smart cards or any other appropriate static or dynamic memory, data storage devices, or remote devices coupled to the respective processor via a data communications device (not shown).

Those skilled in the art will recognize that the exemplary environment and components illustrated in FIG. 1a are not intended to limit the present invention. As such, alternative hardware environments will be appreciated by those skilled in the art and may be used without departing from the scope of the present invention. Also, as will be appreciated, the present invention may be implemented as a method, apparatus, or article of manufacture using standard programming and engineering techniques to produce software, hardware, firmware, or any combination thereof. The term "article of manufacture" as used herein is intended to encompass logic and data embodied in or accessible from any computer usable storage media.

Operation of the Preferred Embodiment

Figure 2A:
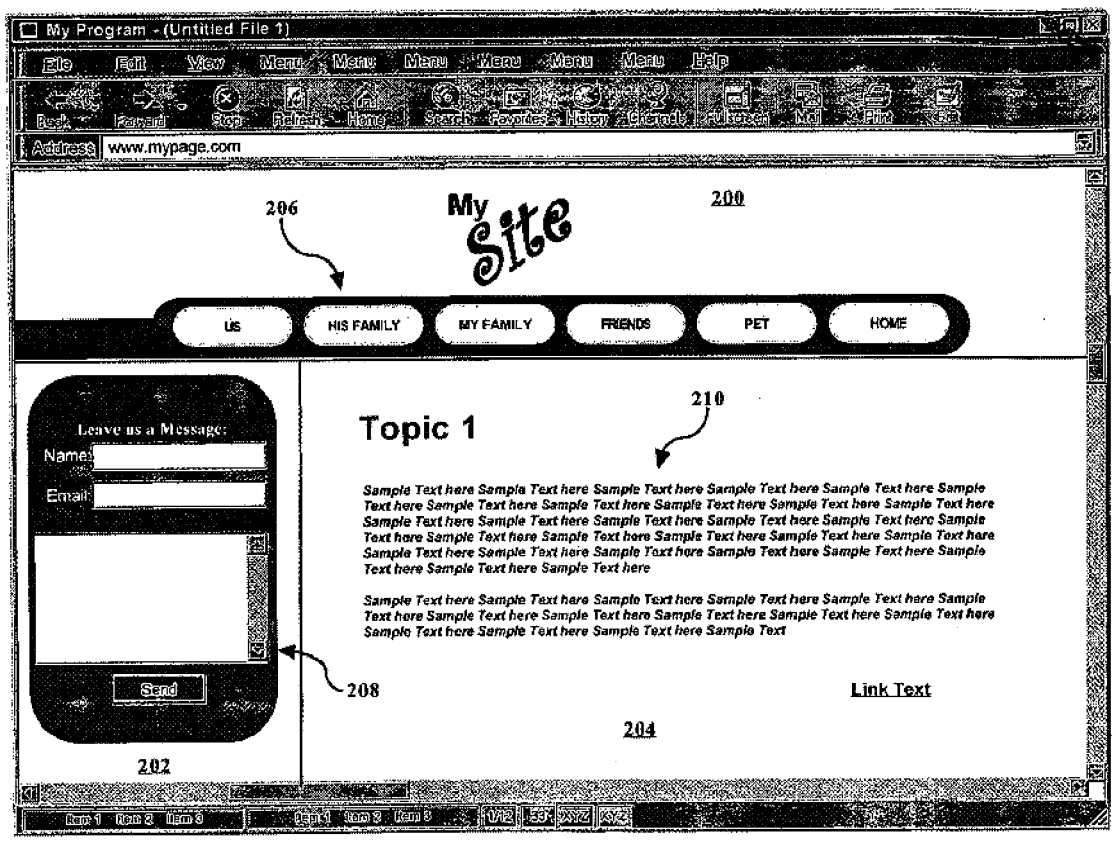
FIGS. 2a and 2b illustrate an exemplary web page utilizing frames in which one of the content areas is changed.
Figure 2B:
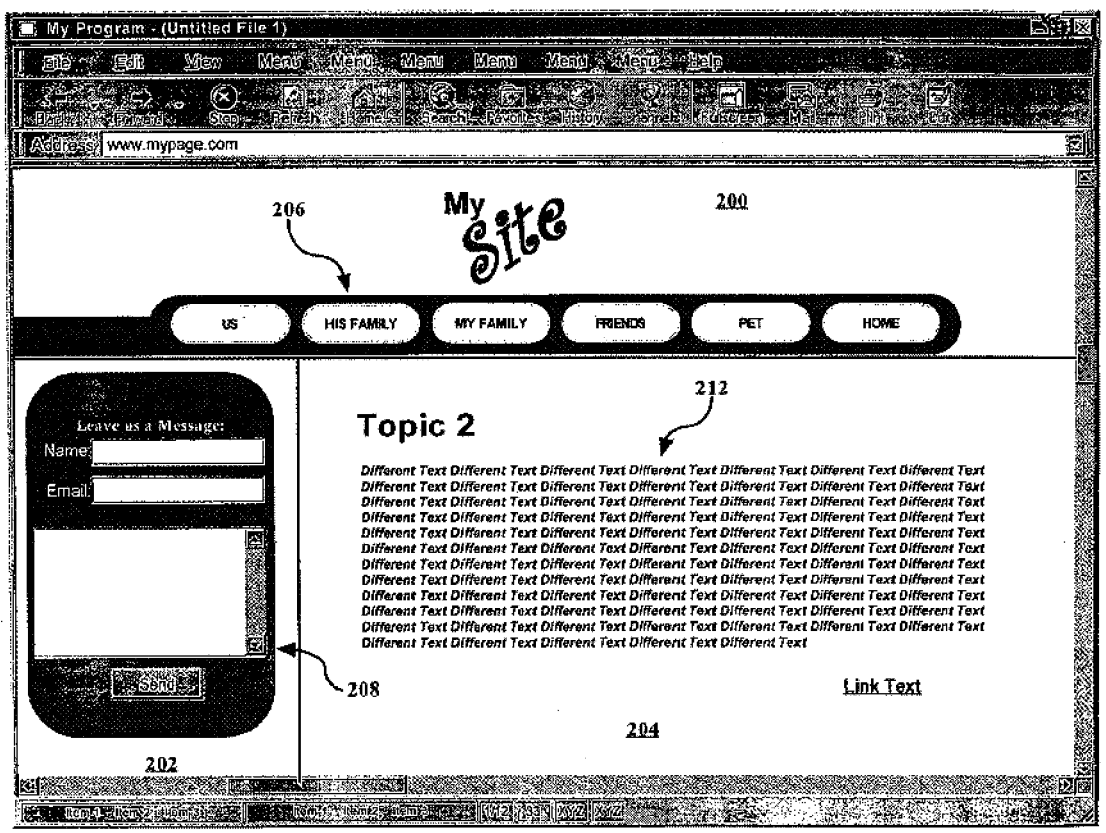

To aid in the understanding of the present invention, FIGS. 2a and 2b illustrate an exemplary web page utilizing frames in which one of the content areas is changed. As shown in FIG. 2a, the exemplary web page is divided into three areas: a top area 200, a lower left area 202 and a lower right area 204. Lower left area 202 contains content of a type known as a form. Lower right area 204 contains textual content. Top area 206 contains content in the form of navigation buttons 206, which, when activated, retrieve additional content for display in lower right area 204. FIG. 2b illustrates this exemplary web page after lower right area 204 has changed in response to an activation of navigation buttons 206 in top area 200. While top area 200 and lower left area 202 stay the same, new textual content 212 is displayed in lower right area 204.

Figure 3A:
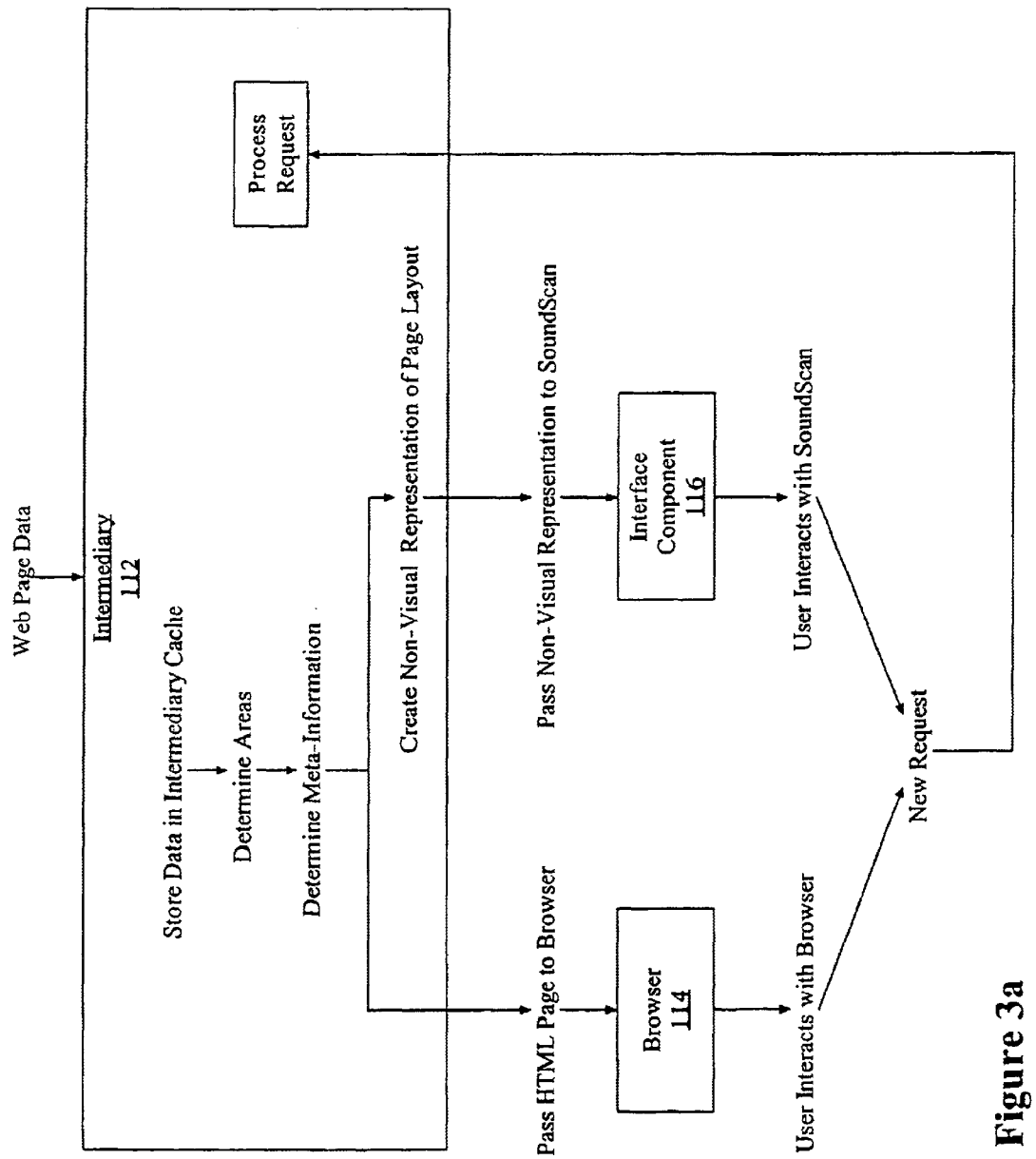
FIG. 3a diagrammatically illustrates the steps performed by an intermediary after receiving web page data.

Web pages, such as the exemplary one, are requested from Web server 104, which sends the web page data to intermediary 112. FIG. 3a diagrammatically illustrates the steps performed by intermediary 112 after receiving web page data. Intermediary 112 first stores the received web page data in an intermediary cache. Next, intermediary 112 determines the distinct areas of content in the page layout and their spatial relationship. For each distinct area, intermediary 112 then determines meta-information of the content in the area. The meta-information provides a higher-level view of the content contained within the areas of the web page by indicating the characteristics, structure and/or composition of the content. The following is exemplary meta-information:

area (frame) was updated.

area contains specific items the user has designated to be of interest, e.g. specific keywords contained in the content.

what kind of content is within the area, e.g. text, form, table cell, header, image?

whether the area is scrollable or visible in its entirety.

number of hyperlinks contained in an area.

percentage/number of hyperlinks linked to information "outside" of the website.

area contains content in a visually impaired user inaccessible form (e.g., java applet, image without ALT tag) or, alternatively, area contains content in a visually impaired user accessible form.

From the area and meta-information determinations, intermediary 112 generates a non-visual, abstract representation of the web page. This non-visual, abstract representation comprises borders of vibratory feedback between the distinct areas and auditory feedback associated with each area, which is representative of the meta-information of the respective area.

The auditory feedback representative of the meta-information utilized is, preferably, earcons or auditory icons. Auditory icons are naturalistic sounds representing a real world equivalent. An example of an auditory icon is the sound of knocking on a door to indicate that somebody is joining an online conversation. Earcons, on the other hand, are abstract sounds that do not always have a real world equivalent. For example a three tone chord in major key indicates a successful save file operation, whereas a three tone chord in a minor key indicates the save operation was not successful. The following articles provide further descriptions of auditory icons and earcons: Blattner, M. M., Sumikawa, D. A., et al. (1989). "Earcons and Icons: Their Structure and Common Design Principles." *Human-Computer Interaction* 4(1): 11–44; Bussemakers, M. P. & deHaan, A. (2000). "When it Sounds like a Duck and it Looks like a Dog . . . Auditory icons vs. Earcons in Multimedia Environments." *Proceedings of the International Conference on Auditory Displays* '2000, Atlanta, Ga., ICAD, pp. 184–189; Gaver, W. W. (1989). "The SonicFinder: An Interface That Uses Auditory Icons." *Human-Computer Interaction* 4(1): 67–94.

Figure 3B:
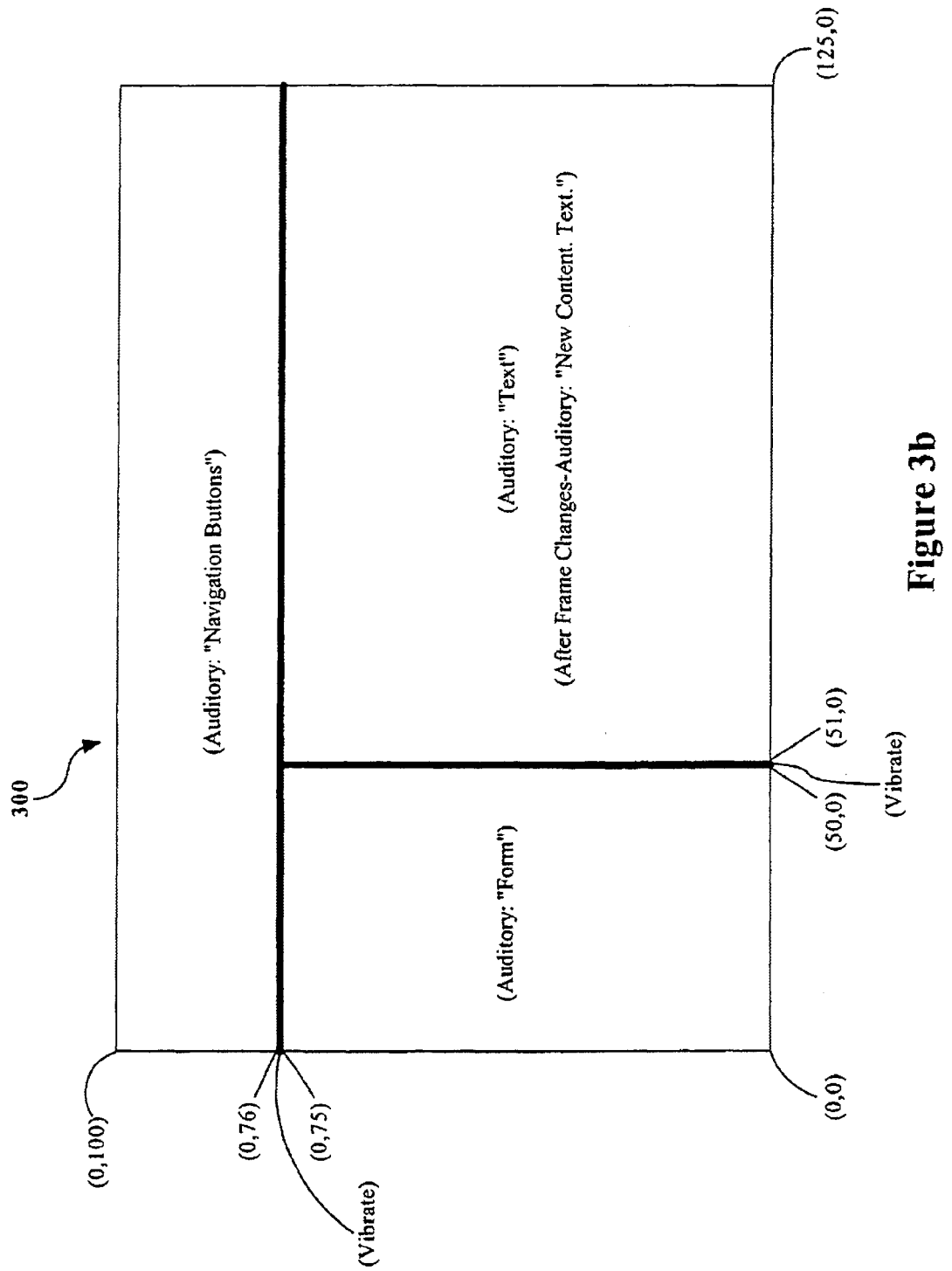
FIG. 3b illustrates a non-visual, abstract representation of the web page shown in FIGS. 2a and 2b.

As an example of the generated representation, FIG. 3b illustrates a non-visual, abstract representation of the web page shown in FIGS. 2a and 2b. Intermediary 112 generates nonvisual, abstract representation 300 by generating data indicating the non-visual feedback associated with coordinates, to which the coordinates of a user's finger on a touch surface of touch pad 108 will be mapped (described below). As shown, a non-visual, abstract representation of the web site of FIG. 2a is generated by associating auditory feedback indicating a "form" with the area bound by x coordinates 0–50 and y coordinates 0–75. This corresponds to lower left area 202. To represent lower right area 204, auditory feedback indicating "text" is associated with the area bound by x coordinates 51–125 and y coordinates 0–75. For the top area 200, auditory feedback indicating "navigation buttons" is associated with the area bound by x coordinates 0–125 and y coordinates 76–100. Also, the boundaries of these areas are delineated by associating vibratory feedback with the areas bound by x coordinates 50–51 and y coordinates 0–75, in addition to x coordinates 0–125 and y coordinates 75–76. All of these coordinates are preferably chosen to represent the general spatial layout and the respective boundary and content area's proportions of the entire web page. Also as illustrated, after lower right area 204 changes, a non-visual, abstract representation is generated similar to before, however, auditory feedback indicating lower right area 204 has new content, i.e. it has changed, is also associated with the area bound by x coordinates 51–125 and y coordinates 0–75.

After the non-visual, abstract representation is generated, it is sent to interface component 116. In addition, the unmodified web page data to web browser 114, for display to a visually capable user. Via touch pad 108, interface component 116 provides a non-visual display of the web page to a user based upon the representation and the coordinates of the user's finger on the touch surface of touch pad 108. In addition, interface component 116 performs actions in response to inputs from the user to provide interaction with the non-visually represented web page.

Figure 4:
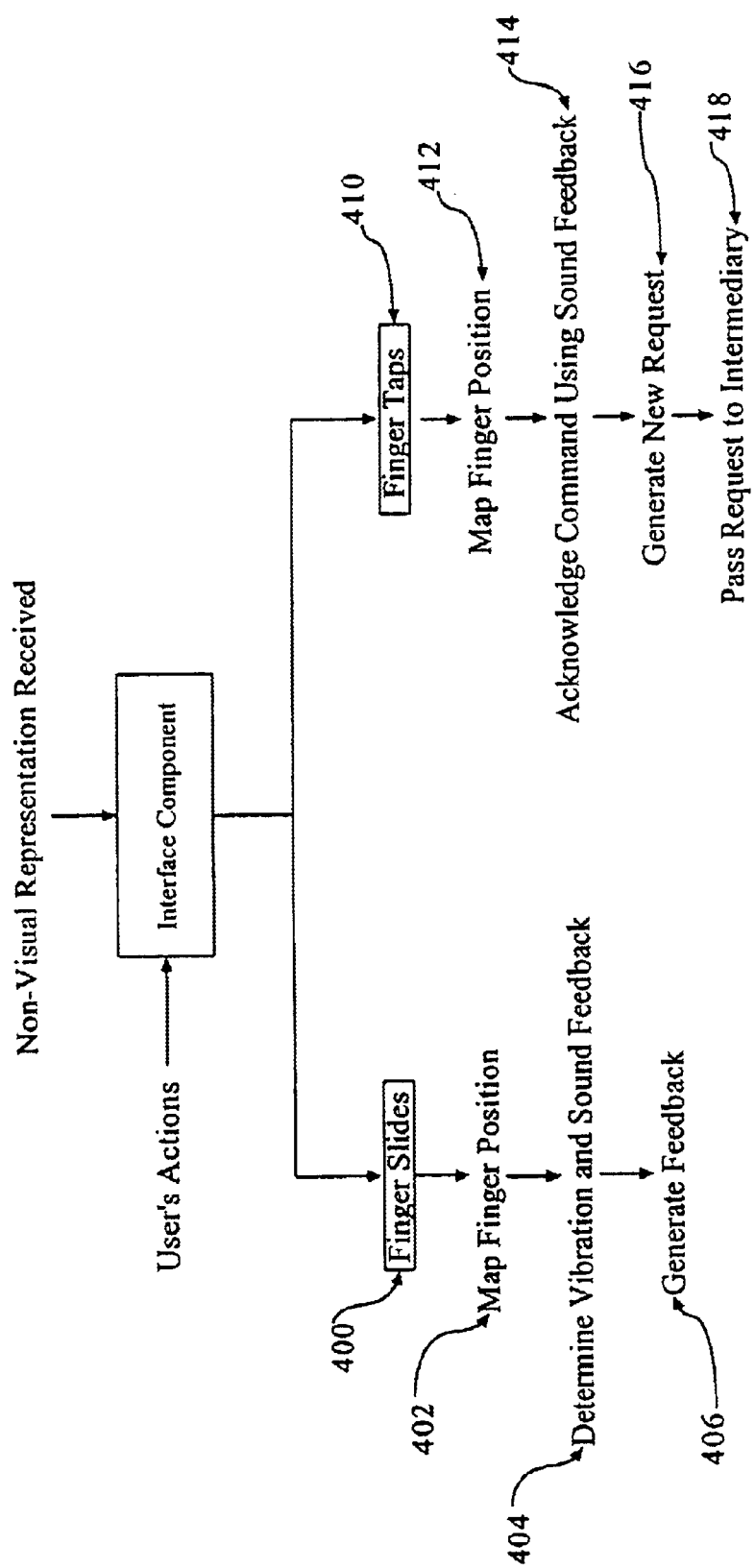
FIG. 4 diagrammatically illustrates the steps performed by an interface component for non-visual display and to provide user interaction with the web page FIG. 5 diagrammatically illustrates the steps performed when the intermediary receives a request from an interface component.

FIG. 4 diagrammatically illustrates the steps performed by interface component 116 for non-visual display and to provide user interaction with the web page. After receiving the non-visual, abstract representation, interface component 116 receives data representative of a user's actions upon touch pad 108. When a user slides their finger 400 across the surface of touch pad 108, interface component 116 provides the non-visual, abstract display of the web page. To provide this display, when the user's finger is slid across touch pad 108, interface component 116 maps the coordinates of the user's finger 402 on touch pad 108 to the coordinates of the non-visual, abstract representation. Interface component 116 then determines the non-visual feedback associated with the coordinates 404 and generates the feedback 406. Thus, when a user's finger crosses a boundary of a content area, interface component 116 causes touch pad 108 to generate vibratory feedback, while, when the user's finger is touching an area, interface component 116 cause an auditory output device to generate auditory feedback corresponding to the meta-information of the area.

In addition to the non-visual display, it is preferable to allow a visually impaired user to interact with the representation to receive more detailed information about content in a given area. Preferably, by tapping one area in the representation, the content of this area is loaded into a linear screen reader. Allowing an indicated area to be loaded eliminates the need of the user to linearly navigate the entire page via the reader to reach the one frame the user is interested in. In addition, or alternatively, a non-visual representation of the content of the area is generated by providing vibratory or auditory feedback for objects contained in the web page, which provides information about the object. Generally, however, the non-visual representation of the content is limited to salient objects due to the limited tactile resolution of users. Interface component 116 then displays this content representation to the user via touch pad 108. Via the linear reader and/or the non-visual representation of the content, the user can view the content in more detail; interact with specific objects on the page, such as forms; or request new pages by following hyperlinks on the web page.

To provide for interaction with the non-visual, abstract representation in the above manner, when a user taps an area 410 of touch pad 108, interface component 112 maps the coordinates of the finger's position 412 to the coordinates of the non-visual, abstract representation. Preferably, interface component 116 generates auditory feedback 414 to acknowledge the request and then generates the request for area content 416. This request is sent 418 to intermediary 112.

Figure 5:
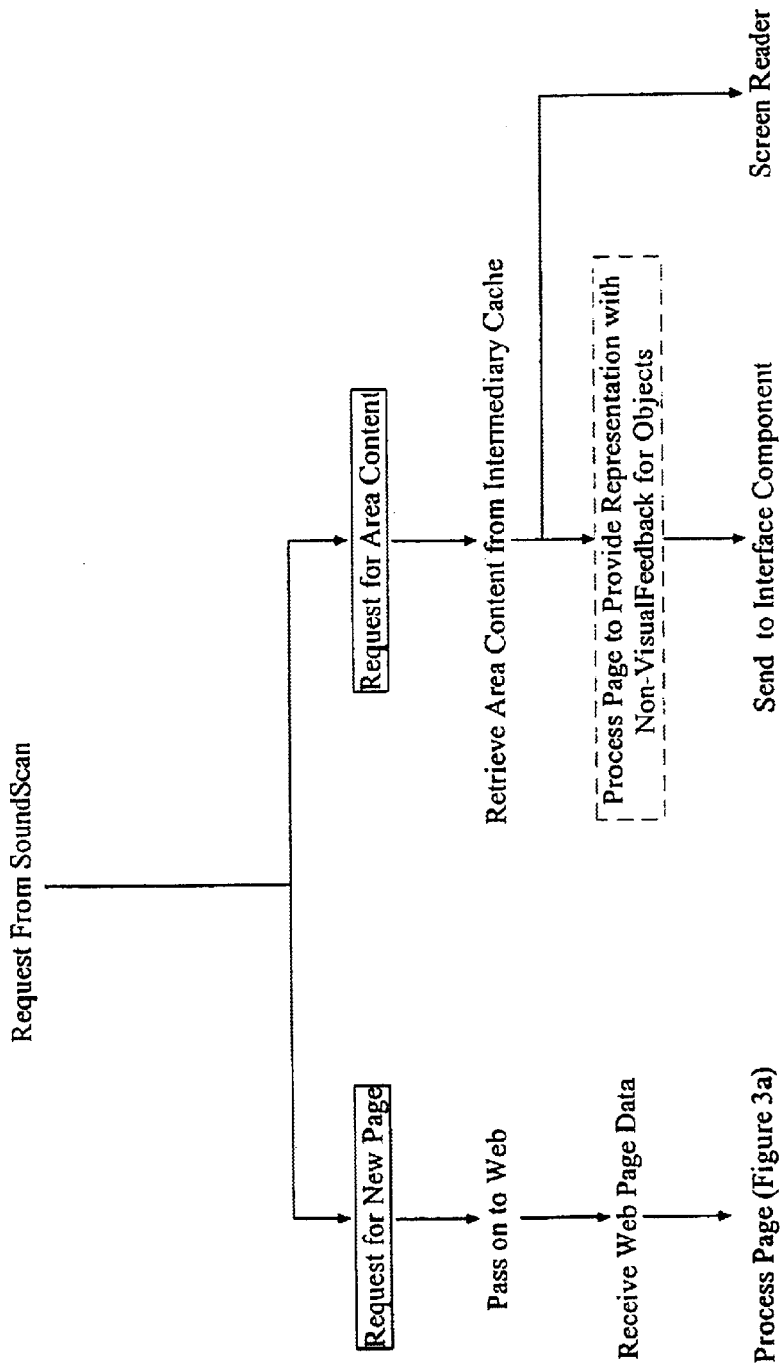

When a user interaction with interface component 116 results in a content request, or when interaction with the browser, linearized content, or non-visual content representation results in a request for a new web page, the request is sent to intermediary 112, which processes the request. FIG. 5 diagrammatically illustrates the steps performed when intermediary 112 receives a request from interface component 116. When the request is one for a new web page, intermediary 112 requests the new web page from the appropriate Web server, receives the web page data and processes it as described in conjunction with FIG. 3a. When the request, however, is for the content of an area, intermediary 112 retrieves the content for the area requested from the intermediary cache, where it was stored when the web page data was received by intermediary 112. This content is then transmitted to the linear reader. In addition, or alternatively, intermediary 112 processes the content to generate a non-visual representation of the content by associating vibratory or auditory feedback with objects of the content and generating data of the spatial layout of the objects. This non-visual representation is then transmitted to interface component 116.

Conclusion and Alternate Embodiments

Figure 6:
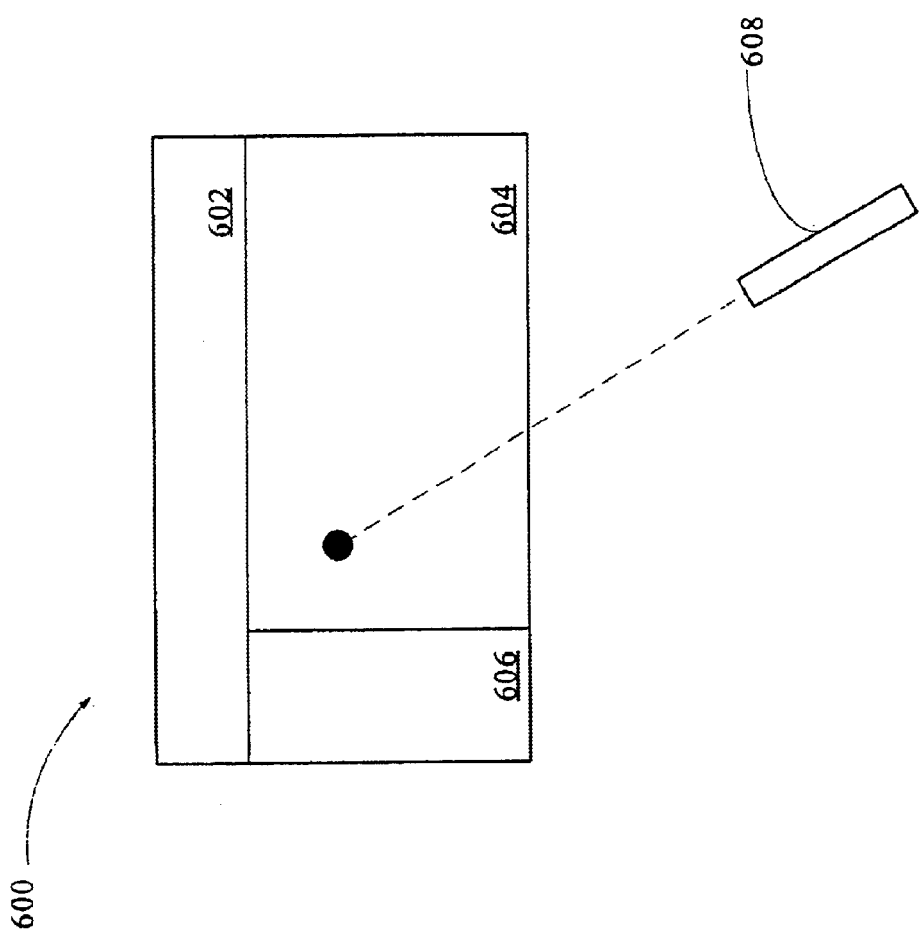
FIG. 6 depicts the use of the present invention with a large-scale projector and a laser pointer.

As previously described, the present invention is not limited to the hardware described in the preferred embodiment. For example, the tactile stimulator array described in U.S. Pat. No. 5,736,978 may advantageously be used in the present invention to provide the tactile feedback. As another example, FIG. 6 depicts the use of the present invention with a large-scale projector 600 and a laser pointer 608. Use with projector 600 and pointer 608 facilitates a visually impaired user in giving a presentation. Laser pointer 608 is used to point a beam of light 610 towards the surface of large scale projector 600, which has a multi-part information page visually and non-visually, or alternatively, just non-visually displayed thereon. The multi-part information page has a number of spatially located areas of separate content 602, 606, and 604. A user navigates the multi-part information page by directing light beam 610 from laser pointer 608 towards projector 600. Projector 600 includes photo-detectors for determining input position coordinates of light beam 610 on projector 600. These input position coordinates are mapped to a non-visual, abstract representation of the multi-part information page. When input position coordinates of light beam 610 crosses the coordinates of the boundaries separating areas of content 602, 606 and 604 in the non-visual, abstract representation, a signal is sent wirelessly to pointer 608, causing pointer to provide vibratory feedback to the user. In addition, when input position coordinates of light beam 610 are in areas of content 602, 602 and 606, auditory feedback representative of content meta-information is provided by an auditory output device. By providing the non-visual feedback of the multi-part information page layout, a visually impaired user is guided in using laser pointer 608 when giving a presentation.

Further, in other embodiments within the scope of the present invention, the tactile feedback is divorced from the input device. Rather, the tactile feedback is provided through another separate device in contact with a portion of the user's body. For instance, a necklace, bracelet or ring worn by the user would receive the feedback commands from interface component 116, transmitted, e.g., by a wireless transmission system. The necklace, bracelet or ring would then generate vibratory or other tactile feedback in response to the received commands.

In addition, a touch pad is used in the preferred embodiment as it can provide for a stationary input device and is closely analogous to a visual display screen. Also, the physical position of the user's finger directly corresponds to the "cursor" input position. This allows the physical locations that generate feedback to remain static. However, other devices providing absolute positioning, such as a digitizer pad where physical location of a mouse is detected and directly corresponds to a cursor input location, are also envisioned within the scope of the present invention. Additionally, input devices providing relative positioning, where physical position does not necessarily directly correspond to the cursor input position, may be used, however, their use may cause a sense of dislocation and confusion to the visually impaired user. Similarly, other forms of tactile feedback than vibratory and other appropriate auditory feedback, such as vocalizations, are also envisioned within the scope of the present invention.

It should also be noted that, while the preferred embodiment of the present invention is particularly suited to operate with web pages and is described in conjunction therewith, other GUIs provide similar environments for interaction via comparable multi-part information pages. For example, the "help" features currently available for many computer applications, such as Microsoft® Word 2000, displays separate content simultaneously in different spatially located areas of the screen to create navigation tools/search facilities for the help database. Therefore, the present invention is not limited to web pages, and the non-visual display of other multi-part information pages is within the scope of the present invention.

Also, while the preferred embodiment of the present invention uses a web browser to aid in the collaboration between sighted users and visually impaired users, the present invention may advantageously be used without a traditional, visual web browser. Yet, when the present invention is used to aid in collaboration efforts between sighted and visually impaired users, it is preferable for the generated tactile display to always correspond to the visible portion of the web page on the screen. By maintaining synchronization between the visual and tactile displays, sighted and visually impaired users can refer to items seen or felt using a shared spatial reference frame (e.g. the item "to the right of this one", "the top left item"). This produces a physical, touchable and tactile analog of the display layout. For easier synchronization of the visual layout and tactile layout, it is preferable to use interface component 116 as the only (shared) input channel while working on a web page.

While various embodiments have been shown and described, there is no intent to limit the invention by such disclosure, but rather, it is intended to cover all modifications and alternate constructions falling within the spirit and scope of the invention, as defined in the appended claims.

What is claimed is:

1. A method of non-visually displaying a multi-part information page containing two or more spatially located areas of separate content, said method comprising:
   maintaining a non-visual, abstract representation of said multi-part information page, said non-visual, abstract representation comprising non-visual display coordinates, said non-visual display coordinates comprising:
      boundary coordinates defining boundaries between said two or more spatially located areas, said boundary coordinates associated with tactile feedback;
      content coordinates defining said two or more spatially located areas, said content coordinates associated with auditory feedback, said auditory feedback representative of content meta-information;
   receiving input position coordinates;
   mapping said position input coordinates to said non-visual display coordinates;
   generating a tactile output to cause a tactile output device to generate said tactile feedback for position input coordinates mapped to said boundary coordinates, and
   generating an auditory output to cause an auditory output device to generate said auditory feedback for position input coordinates mapped to said content coordinates.

2. A method of non-visually displaying a multi-part information page containing two or more spatially located areas of separate content, as per claim 1, wherein said content meta-information indicates any of: area updated; area contains specific items designated of interest; kind of content within area; area is scrollable; area is visible in its entirety; number of hyperlinks in area; area contains content in a visually impaired user inaccessible form; or area contains content in a visually impaired user accessible form.

3. A method of non-visually displaying a multi-part information page containing two or more spatially located areas of separate content, as per claim 1, said method further comprising:
   receiving data representative of said multi-part information page;
   determining said two or more spatially located areas from said data;
   determining said content meta-information for said separate content from said data, and
   generating said non-visual, abstract representation from said area determination and said content meta-information determination.

4. A method of non-visually displaying a multi-part information page containing two or more spatially located areas of separate content, as per claim 3, said method further comprising:
   caching said data representative of said multi-part information page.

5. A method of non-visually displaying a multi-part information page containing two or more spatially located areas of separate content, as per claim 4, said method further comprising:
   receiving a request for said content in one of said areas;
   retrieving said requested content from said cached data, and
   transmitting said content to a linear screen reader.

6. A method of non-visually displaying a multi-part information page containing two or more spatially located areas of separate content, as per claim 5, wherein said multi-part information page is a web page containing frames.

7. A method of non-visually displaying a multi-part information page containing two or more spatially located areas of separate content, as per claim 4, said method further comprising:
   receiving a request for said content in one of said areas;
   retrieving said requested content from said cached data, and
   generating a non-visual representation of said content displayable by said tactile output device and said auditory output device.

8. A method of non-visually displaying a multi-part information page containing two or more spatially located areas of separate content, as per claim 7, wherein said multi-part information page is a web page containing frames.

9. A method of non-visually displaying a multi-part information page containing two or more spatially located areas of separate content, as per claim 7, said method further comprising:
   displaying said non-visual representation of said content via said tactile output device and said auditory output device.

10. A method of non-visually displaying a multi-part information page containing two or more spatially located areas of separate content, as per claim 1, wherein said multi-part information page is a web page containing frames.

11. A method of non-visually displaying a multi-part information page containing two or more spatially located areas of separate content, as per claim 1, wherein said multi-part information page is visually displayed.

12. A method of non-visually displaying a multi-part information page containing two or more spatially located areas of separate content, as per claim 11, wherein said non-visual, abstract representation is synchronized with said visually displayed multi-part information page.

13. A method of non-visually displaying a multi-part information page containing two or more spatially located areas of separate content, as per claim 1, wherein said tactile output device comprises any one of a touch pad, a bracelet, a ring, a necklace or a laser pointer.

14. A system for non-visually displaying a multi-part information page containing two or more spatially located areas of separate content, said system comprising:
   an intermediary, said intermediary generating a non-visual, abstract representation of said multi-part information page, said non-visual, abstract representation comprising non-visual display coordinates, said non-visual display coordinates comprising:
      boundary coordinates defining boundaries between said two or more spatially located areas, said boundary coordinates associated with tactile feedback;
      content coordinates defining said two or more spatially located areas, said content coordinates associated with auditory feedback, said auditory feedback representative of content meta-information;
   a non-visual input/output interface;
   said interface receiving said non-visual, abstract representation from said intermediary;
   said interface receiving input position coordinates;
   said interface mapping said position input coordinates to said non-visual display coordinates;
   said interface generating a tactile output to cause a tactile output device to generate said tactile feedback for position input coordinates mapped to said boundary coordinates, and
   said interface generating an auditory output to cause an auditory output device to generate said auditory feedback for position input coordinates mapped to said content coordinates.

15. A system for non-visually displaying a multi-part information page containing two or more spatially located areas of separate content, as per claim 14, wherein said content meta-information indicates any of: area updated; area contains specific items designated of interest; kind of content within area; area is scrollable; area is visible in its entirety; number of hyperlinks in area; area contains content in a visually impaired user inaccessible form; or area contains content in a visually impaired user accessible form.

16. A system for non-visually displaying a multi-part information page containing two or more spatially located areas of separate content, as per claim 14, wherein:
   said intermediary receives a request for said content in one of said areas;
   said intermediary retrieves said requested content from said cached data, and
   said intermediary transmits said content to a linear screen reader.

17. A system for non-visually displaying a multi-part information page containing two or more spatially located areas of separate content, as per claim 14, wherein:
   said intermediary receives a request for said content in one of said areas;
   said intermediary retrieves said requested content from said cached data;
   said intermediary generates a non-visual representation of said content displayable by said tactile output device and said auditory output device, and said intermediary transmitting said non-visual representation of said content to said interface.

18. A system for non-visually displaying a multi-part information page containing two or more spatially located areas of separate content, as per claim 14, wherein said multi-part information page is a web page containing frames.

19. A system for non-visually displaying a multi-part information page containing two or more spatially located areas of separate content, as per claim 14, wherein said tactile output device comprises any one of a touch pad, a bracelet, a ring, a necklace or a laser pointer.

20. A system for facilitating collaboration between visually impaired and sighted users including a computer-based device, said device providing representations to said visually impaired users of a multi-part information page's visual appearance by way of auditory and tactile feedback references indicating content layout and meta-information of content in a visually displayed multi-part information page, said system comprising:
 a visual display, said display including a graphical representation, said graphical representation comprising one or more boundaries separating two or more content areas having distinct viewable content;
 an electronic input device, said input device generating input position coordinates;
 computer-based processor, said processor receiving said input position coordinates;
 computer-based memory, said memory storing at least boundary coordinates corresponding to said visually displayed boundaries and content coordinates corresponding to said visually displayed content areas;
 an auditory output device;
 a tactile output device;
 said computer-based processor comparing said stored coordinates with said input position coordinates;
 said computer-based processor providing auditory feedback via said auditory output device representative of meta-information of viewable content in a content area for input position coordinates substantially equal to said content coordinates, and
 said computer-based processor providing tactile feedback via said tactile output device for input position coordinates substantially equal to said boundary coordinates.

21. A system for facilitating collaboration between visually impaired and sighted users including a computer-based device, said device providing representations to said visually impaired users of a multi-part information page's visual appearance by way of auditory and tactile feedback references indicating content layout and meta-information of content in a visually displayed multi-part information page, as per claim 20, wherein said electronic input device and said tactile output device is combined as an electronic touch pad, said touch pad generating said input position coordinates from user finger movements over various areas of a touch surface of said touch pad, said touch pad providing said tactile feedback in the form of vibrations.

22. A system for facilitating collaboration between visually impaired and sighted users including a computer-based device, said device providing representations to said visually impaired users of a multi-part information page's visual appearance by way of auditory and tactile feedback references indicating content layout and meta-information of content in a visually displayed multi-part information page, as per claim 20, wherein said tactile output device comprises any one of a bracelet, a necklace or a laser pointer.

23. A system for facilitating collaboration between visually impaired and sighted users including a computer-based device, said device providing representations to said visually impaired users of a multi-part information page's visual appearance by way of auditory and tactile feedback references indicating content layout and meta-information of content in a visually displayed multi-part information page, as per claim 20, wherein said multi-part information page is a web page containing frames.

24. An article of manufacture comprising a computer usable storage medium having computer readable data and instructions embodied therein for non-visually displaying a multi-part information page containing two or more spatially located areas of separate content, said computer readable data and instructions comprising:
 computer readable data and instructions for maintaining a non-visual, abstract representation of said multi-part information page, said non-visual, abstract representation comprising non-visual display coordinates, said non-visual display coordinates comprising:
  boundary coordinates defining boundaries between said two or more spatially located areas, said boundary coordinates associated with tactile feedback;
  content coordinates defining said two or more spatially located areas, said content coordinates associated with auditory feedback, said auditory feedback representative of content meta-information;
 computer readable data and instructions for receiving input position coordinates;
 computer readable data and instructions for mapping said position input coordinates to said non-visual display coordinates;
 computer readable data and instructions for generating a tactile output to cause a tactile output device to generate said tactile feedback for position input coordinates mapped to said boundary coordinates, and
 computer readable data and instructions for generating an auditory output to cause an auditory output device to generate said auditory feedback for position input coordinates mapped to said content coordinates.

25. A method of non-visually representing graphical images by mapping included content sections and associated boundaries to non-visual feedback parameters, said image comprising a multiplicity of content sections and associated boundaries, said method comprising:
 receiving a request from a requester to represent a specific instance of one of said graphical images;
 generating a non-visual coordinate representation of said specific instance, said representation including specific content sections and associated boundaries;
 instantiating said non-visual feedback parameters in one or more user input/output devices such that the requestor recognizes, non-visually, specific content sections and associated boundaries of said graphical image.

26. A method of non-visually representing graphical images by mapping included content sections and associated boundaries to non-visual feedback parameters, said image comprising a multiplicity of content sections and associated boundaries, as per claim 25, wherein said physically recognized feedback parameters comprise tactile feedback for boundaries and specific sounds for content locations.

* * * * *